US011068686B2

(12) United States Patent
Shen

(10) Patent No.: US 11,068,686 B2
(45) Date of Patent: Jul. 20, 2021

(54) LOW POWER BASELINE TRACKING FOR FINGERPRINT SENSOR

(71) Applicant: Synaptics Incorporated, San Jose, CA (US)

(72) Inventor: Guozhong Shen, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 161 days.

(21) Appl. No.: 16/129,110

(22) Filed: Sep. 12, 2018

(65) Prior Publication Data

US 2019/0080134 A1 Mar. 14, 2019

Related U.S. Application Data

(60) Provisional application No. 62/557,523, filed on Sep. 12, 2017.

(51) Int. Cl.
*G06K 9/00* (2006.01)
*G06F 1/3231* (2019.01)
*G06F 1/3234* (2019.01)

(52) U.S. Cl.
CPC ........... *G06K 9/0002* (2013.01); *G06F 1/325* (2013.01); *G06F 1/3231* (2013.01); *G06K 9/00013* (2013.01)

(58) Field of Classification Search
None
See application file for complete search history.

(56) References Cited

U.S. PATENT DOCUMENTS

| 5,757,712 | A | 5/1998 | Nagel et al. |
| 7,643,950 | B1 | 1/2010 | Getzin et al. |
| 8,339,286 | B2 | 12/2012 | Cordeiro |
| 9,263,098 | B2 | 2/2016 | Yoo et al. |
| 2006/0061383 | A1 | 3/2006 | Huang et al. |
| 2006/0235630 | A1 | 10/2006 | Ito et al. |
| 2008/0047764 | A1 | 2/2008 | Lee et al. |
| 2008/0158182 | A1 | 7/2008 | Westerman |
| 2009/0135157 | A1 | 5/2009 | Harley |
| 2011/0216016 | A1* | 9/2011 | Rosener ................. G06F 3/041 345/173 |
| 2012/0105357 | A1* | 5/2012 | Li ..................... G06F 3/041661 345/174 |
| 2013/0021044 | A1 | 1/2013 | Thompson et al. |
| 2014/0015793 | A1 | 1/2014 | Chen et al. |
| 2014/0359757 | A1* | 12/2014 | Sezan ................. G06F 3/04886 726/19 |
| 2015/0002179 | A1 | 1/2015 | Akebono et al. |

(Continued)

*Primary Examiner* — Sean M Conner
(74) *Attorney, Agent, or Firm* — Leydig, Voit & Mayer, Ltd.

(57) ABSTRACT

Low power consumption baseline tracking systems and methods for automatically tracking a baseline input into a capacitive sensor having a plurality of transmitter electrodes and a plurality of receiver electrodes. A partial baseline scan is captured by driving all or a portion of the plurality of transmitter electrodes simultaneously and detecting receiver signals from a subset of the at least one receiver electrode simultaneously, and the partial baseline scan is compared with a stored baseline image. When a difference between the captured partial baseline scan and the stored baseline image exceeds a threshold value, a full baseline image scan is acquired, and the stored baseline image is updated.

17 Claims, 3 Drawing Sheets

(56) References Cited

U.S. PATENT DOCUMENTS

| | | | |
|---|---|---|---|
| 2015/0005976 A1 | 1/2015 | Akebono et al. | |
| 2016/0335471 A1* | 11/2016 | Alameh | G06F 1/3262 |
| 2016/0358003 A1* | 12/2016 | Shen | G06K 9/0002 |
| 2018/0032783 A1* | 2/2018 | Wu | D05B 35/00 |
| 2018/0129861 A1* | 5/2018 | Kim | G06F 16/51 |
| 2018/0217710 A1* | 8/2018 | Cholasta | G06F 3/041661 |

* cited by examiner

LOW POWER BASELINE TRACKING FOR FINGERPRINT SENSOR

CROSS REFERENCES

The present Application for Patent claims priority to U.S. Provisional Patent Application No. 62/557,523, entitled "LOW POWER BASELINE TRACKING FOR FINGERPRINT SENSOR," filed Sep. 12, 2017, which is incorporated herein by reference in its entirety.

FIELD

The present disclosure generally provides systems and methods for electronic sensing, and more particularly, for capacitive fingerprint sensing.

BACKGROUND

Biometric authentication systems are used for authenticating users of devices incorporating the authentication systems. Among other things, biometric sensing technology can provide a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Constantly scanning a fingerprint sensor array to capture an image may unnecessarily consume power when there is no corresponding fingerprint to be imaged. To minimize power consumption, a fingerprint presence detection system is often used to detect the presence of a finger before entering a higher power fingerprint imaging mode.

In view of the above, there is a need for a finger presence detection system of a fingerprint sensor that provides an accurate indication of finger presence over a sensor. These and other advantages of the disclosure, as well as additional inventive features, will be apparent from the description of the disclosure provided herein.

BRIEF SUMMARY

The present disclosure provides low power consumption baseline tracking systems and methods, with reduced power consumption.

According to an embodiment, a method is provided for automatically tracking a baseline input into a capacitive sensor having a plurality of transmitter electrodes and a plurality of receiver electrodes. The method typically includes acquiring or capturing a partial baseline image, e.g., by driving all or a portion of the plurality of transmitter electrodes and detecting receiver signals from a subset of the at least one receiver electrode, and comparing the partial baseline image with a stored baseline image. The method also typically includes, in response to a difference between the captured partial baseline image and the stored baseline image exceeding a threshold value, acquiring a full baseline image, and updating the stored baseline image. Updating may include storing the acquired full image as the stored baseline image.

According to another embodiment, a control circuit for controlling capacitive sensing operations of a capacitive sensor is provided. The control circuit typically includes a processor, one or a plurality of transmitter leads for connecting to a plurality of transmitter electrodes of a capacitive sensor, and one or a plurality of receiver leads for connecting to a plurality of receiver electrodes of the capacitive sensor. The control circuit is typically configured to, e.g., when connected to a capacitive sensor, control the capacitive sensor to acquire a partial baseline image, e.g., by driving all or a portion of the plurality of transmitter electrodes and detecting receiver signals from a subset of the at least one receiver electrode, compare the partial baseline image with a baseline image stored in a memory, and in response to a difference between the captured partial baseline image and the stored baseline image exceeding a threshold value, control the capacitive sensor to acquire a full baseline image, and update the stored baseline image using the acquired full baseline image.

According to yet another embodiment, an electronic device for capacitive fingerprint sensing is provided. The electronic device typically includes a capacitive fingerprint sensor having a plurality of sensor electrodes comprising a plurality of transmitter electrodes, and at least one receiver electrode, wherein the capacitive fingerprint sensor is configured to capacitively sense an input fingerprint on an input surface in proximity to the plurality of sensor electrodes. The electronic device also typically includes a processing system comprising one more processing elements, the processing system coupled to the capacitive fingerprint sensor and configured to drive the plurality of transmitter electrodes and to detect receiver signals from the at least one receiver electrode, wherein the processing system is configured to control the capacitive fingerprint sensor to acquire a partial baseline image, e.g., by driving all or a portion of the plurality of transmitter electrodes and detecting receiver signals from a subset of the at least one receiver electrode. The processing system is further typically configured to compare the partial baseline image with a stored baseline image, and in response to a difference between the captured partial baseline image and the stored baseline image exceeding a threshold value, control the capacitive sensor to acquire a full baseline image, and update the stored baseline image using the acquired full baseline image.

According to a further embodiment, an electronic system for capacitive sensing is provided. The electronic system typically includes a capacitive sensor configured to capacitively sense an input object in proximity to a plurality of sensor electrodes comprising a plurality of transmitter electrodes, and at least one receiver electrode, and a processing system configured to drive the plurality of transmitter electrodes and to detect receiver signals from the at least one receiver electrode. The processing system is typically configured to control the capacitive sensor to acquire a partial baseline image, e.g., by driving all or a portion of the plurality of transmitter electrodes and detecting receiver signals from a subset of the at least one receiver electrode. The processing system is further typically configured to compare the partial baseline image with a stored baseline image, and in response to a difference between the captured partial baseline image and the stored baseline image exceeding a threshold value, control the capacitive sensor to acquire a full baseline image, and update the stored baseline image using the acquired full baseline image.

In certain aspects, driving all or a portion of the plurality of transmitter electrodes includes applying a driving subset of a plurality of distinct waveforms in a sequence to the transmitter electrodes, wherein the driving subset comprises less than all of the plurality of distinct waveforms. In certain aspects, a full baseline image is acquired by applying a plurality of distinct waveforms in a sequence to the plurality of transmitter electrodes simultaneously, and detecting receiver signals from the at least one receiver electrode for each of the plurality of waveforms applied to the plurality of transmitter electrodes.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

DETAILED DESCRIPTION

Figure 1:
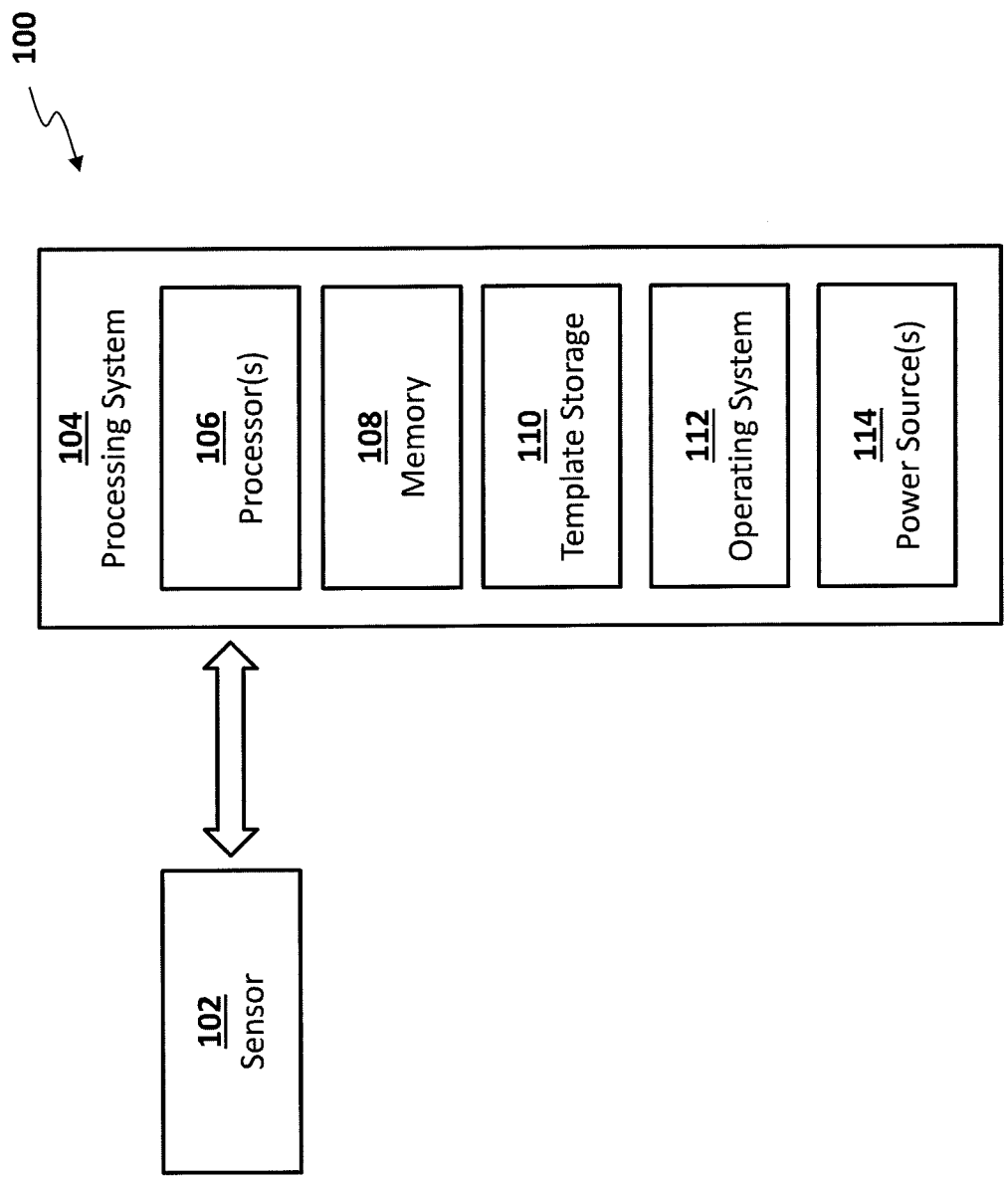
FIG. 1 is a block diagram of an exemplary system that includes an input device and a processing system, in accordance with an embodiment of the disclosure.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One way to detect presence of a finger or other input object is to use one or more dedicated presence sensing elements on the input device. For example, in a fingerprint sensor, finger presence sensing electrodes may be used in addition to the electrodes of a sensing array that are used to capture an image of a fingerprint in a sensing region of the input device.

Another way to detect presence of a finger or other input object is to re-use selected sensor electrodes of the sensor array as presence sensing electrodes for presence detection. This embodiment may allow space to be saved by avoiding a need for dedicated presence sensing electrodes, as well as allowing for more accurate presence detection by using electrodes for presence detection that coincide with the sensor array.

A drawback to using presence sensing electrodes, either dedicated or not, is that typically, in certain embodiments of the input device, the presence sensing electrodes may be disposed underneath a cover layer, e.g., a cover lens or cover glass. An example of a cover layer might be a glass or polymer material overlaying the fingerprint sensor, where a surface of the glass or polymer material acts as the input surface. Because the electrodes are disposed underneath the cover layer, a portion of an electric field utilized to detect the presence of an input object, such as a fingerprint when the input device is configured as a fingerprint sensor, will not be exposed outside of the cover layer. Also, this portion of the electric field not exposed outside of the cover layer will increase as a cover layer thickness increases. As such, any such signal indicating the presence of an input object will not have high gain to amplify the signal. Accordingly, a sensitivity of the input device will be affected by the thickness of the cover layer.

For example, in certain embodiments, an input device of a smart phone may include presence sensing electrodes for detecting an input object, such as a fingerprint. Regardless of whether the presence sensing electrodes are either dedicated presence sensing electrodes or selected sensor electrodes of the sensor array, the presence sensing electrodes may be disposed under a cover lens of the smart phone. As such, a portion of the electric field utilized to detect the presence of the fingerprint will not be exposed outside of the cover lens, which will reduce the sensitivity of the input device.

An additional drawback to using presence sensing electrodes for presence detection of an input object is that the sensor electrodes and their associated circuitry, such as one or more amplifiers, are exposed to temperature fluctuations within the device. As the temperature of the device changes, the output of the one or more amplifiers may be affected. This may cause drift in the output of the one or more amplifiers and make the detection of the input object more difficult.

To address the above discussed drawbacks, signal conditioning elements are added in parallel to the presence sensing electrodes. The signal conditioning elements may be added in parallel regardless of whether the presence sensing electrodes are dedicated or not. By doing so, the sensitivity of an output signal from the presence sensing electrodes will be increased such that the signal can be amplified with high gain. Further, one or more comparator devices may be implemented on the output of the presence sensing electrodes so to compare the output to threshold values in order to monitor and correct any drift experienced from temperature or other negative environmental factors.

Turning now to the figures, FIG. 1 is a block diagram of an electronic system or device 100 that includes an input device such as sensor 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I²C, SPI, PS/2, Universal Serial Bus (USB), Bluetooth, RF, and IRDA.

The device 100 may utilize any combination of sensor components and sensing technologies to detect user input in the sensing region. The device 100 comprises one or more sensing elements for detecting user input. For example, the device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" (or "trans-capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. The reference voltage may be a substantially constant voltage in various embodiments, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals).

It will be appreciated that embodiments of this disclosure are also usable in environments utilizing "self-capacitance" techniques. "Self capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and, in various embodiments, the reference voltage may be system ground.

In certain embodiments, sensor 102 is a biometric sensor utilizing one or more various electronic sensing technologies to capture an image of a biometric pattern, such as a fingerprint, palm print, handprint, or vein pattern of a user. In certain embodiments, the biometric sensor is a capacitive fingerprint sensor which utilizes mutual capacitance sensing techniques between sensor electrodes in a second mode to detect presence of a finger or other biometric object in a sensing area. In a fingerprint sensor embodiment, for example, upon detection of a finger, the fingerprint sensor may utilize a full array of sensor electrodes in a first mode to capture or acquire an image of a fingerprint in the sensing area using mutual capacitance or self-capacitance sensing techniques. By way of example, the sensor electrodes used to detect presence of a finger in the second mode may be separate presence sensing electrodes, or they may be a selected subset, or all, of the electrodes used to capture the image of the fingerprint.

Turning now to the processing system 104 from FIG. 1, basic functional components of the electronic device 100 utilized during capturing and storing a user fingerprint image are illustrated. The processing system 104 includes a processor(s) 106, a memory 108, a template storage 110, an operating system (OS) 112 and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

The processing system 104 is configured to or adapted to control operation of sensor 102, e.g., implement the various processes, including the settlement detection and full scan imaging processes, as described herein. For example, the processing system 104 may be implemented in part or in whole as a control circuit that controls operation of the sensor 102 to drive transmitter electrode(s) using one or a plurality of physical transmitter leads, to receive signals from receiver electrodes(s) using one or a plurality of physical receiver leads, and to process receiver electrode signals as described herein. Additionally, the control circuit including processing system 104 may be physically separate from and communicably coupled with the main processing system controlling overall operation of the device 100, which includes or is couple to sensor 102.

Fingerprint sensors are sometimes referred to as swipe sensors or placement sensors depending on their principle of operation. Typically, swipe sensors capture an image that is larger than the sensing area by capturing a series of scans of the fingerprint as the user swipes or otherwise moves their finger over the sensing area. A processing system then reconstructs the scans into a larger swipe image. Since the image is reconstructed from a series of scans, this allows the sensing array to be made small, such as a small two-dimensional array or even as small as a single linear array, while still capturing a series of scans that can be reconstructed into a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Figure 2:
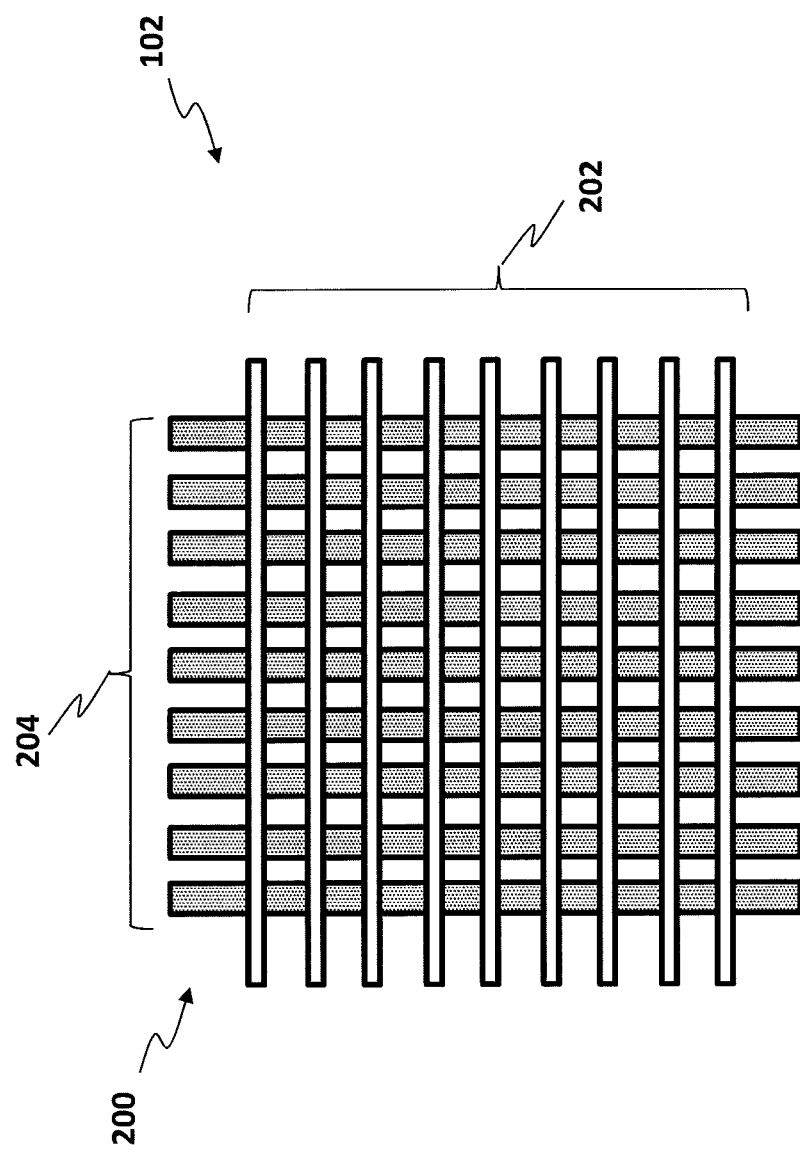
FIG. 2 is a schematic view of a capacitive sensor, in accordance with an embodiment of the disclosure.

FIG. 2 illustrates an exemplary embodiment of the sensor 102 in accordance with the disclosure contained herein. FIG. 2 illustrates an embodiment of the sensor 102 configured as a capacitive sensor that includes a plurality of electrodes 200, including a set of transmitter electrodes 204 and one or more receiver electrode 202 (e.g., a plurality of receiver electrodes 202 are shown), arranged in a two-dimensional array of pixels. A pixel is formed at the capacitive coupling between each of the transmitter electrodes 204 and each of the receiver electrodes 202. In the depicted embodiment, the sensor electrodes 200 are operated to acquire or capture an image of a fingerprint by driving transmitter signals onto each of the transmitter electrodes 204, and detecting resulting signals at the receiver electrode(s) 202 that correspond to the transmitter signals. In one implementation, the transmitter signals are driven onto each of the transmitter electrodes 204 one at a time, in a sequence one after another. In another implementation, transmitter signals are driven onto multiple transmitter electrodes simultaneously, using a code division multiplexing (CDM) or time-division multiplexing (TDM) sensing scheme.

In certain embodiments, a separate control circuit such as an integrated circuit (IC) may be configured to control operation of sensor 102 by providing drive signals to the transmitter via one or a plurality of dedicated transmitter leads or pins, and by receiving receiver signals via one or a plurality of dedicated receiver leads or pins. The control circuit may process the receiver signals, and/or provide the signals to a different system for processing, to determine object presence.

In the sensor 102 of FIG. 2, rows of receiver electrodes 202 overlap columns of transmitter electrodes 204 to form a pixel based on a capacitive coupling at each overlap location. In one implementation, the receiver electrodes 202 and transmitter electrodes 204 are formed on the same substrate. In another implementation, they are formed on different substrates. In either case, dielectric material may separate the set of transmitter electrodes 204 and the set of receiver electrodes 202 at each overlap location, and one of the sets may be closer to a sensing area where a finger or other object is placed. In one implementation, the receiver electrodes 202 are disposed closer to a sensing area of the capacitive sensor 102, and selected receiver electrodes are operated in a low power mode to detect a presence of a finger.

In the embodiment illustrated in FIG. 2, the transmitter electrodes 204 and receiver electrodes 202 are depicted as sets of bars and stripes, respectively. The transmitter electrodes 204 each extend parallel to each other, and the receiver electrodes 202 may also extend parallel to each other, in a different direction from the transmitter electrodes to form a two-dimensional array of pixels. In the illustrated embodiment, the transmitter electrodes and receiver electrodes extend perpendicular to each other. The transmitter electrodes and receiver electrodes may be formed, for example, on separate respective substrates, or opposing sides of the same substrate, and in either case the substrate material may separate the transmitter electrodes 204 and receiver electrodes 202 to form capacitive gaps between them at each overlap location.

It will be appreciated that other sensor array patterns are possible without departing from the principles described herein. For example, other electrode shapes such as diamond patterns or other geometrical patterns are possible without departing from certain principles described herein. Similarly, other electrode orientations besides perpendicular rows and columns are possible without departing from certain principles described herein. It will also be appreciated that transmitter signals can be driven onto each of the transmitter electrodes 204 and resulting signals can be detected at each of the receiver electrodes 202 using a variety of modulation schemes in order to capture an image of the sensing area. In one embodiment, the transmitter signals are driven onto each of the transmitter electrodes 204 one at a time, in a sequence one after another. In another embodiment, transmitter signals are driven onto multiple or all transmitter electrodes simultaneously and/or resulting signals are detected at each of one or multiple receiver electrodes simultaneously, using a code division multiplexing (CDM) or time-division multiplexing (TDM) sensing scheme. Examples of multiplexing signals useful in the context of the transmitter electrodes and receiver electrode (s) of the present disclosure can be found in U.S. Pat. No. 8,558,811, which is hereby incorporated by reference herein in its entirety.

In one embodiment, the illustrated electrode and circuit arrangements may depict a selected subset or all of electrodes 200 from the sensor 102 re-used for finger presence detection, in accordance with principles described herein. In another embodiment, the electrode and circuit arrangements may depict dedicated electrodes utilized for finger presence detection, in accordance with principles described herein. Regardless of whether the arrangement of electrodes and the associated circuitry is configured to re-use selected sensor electrodes from sensor 102 or are dedicated for finger presence detection and separate from the sensor 102, the techniques and principles disclosed herein are applicable.

Receiver electrodes 202 are configured to detect resulting signals corresponding to the transmitter signal driven onto transmitter electrodes 204. The resulting signals may be provided to an amplifier. Accordingly, a resulting output is a low noise gain signal that correlates to an amount of energy capacitively coupled from the transmit electrodes 204 to the receiver electrodes 202. The amount of energy coupled from a transmitter electrode 204 to a receiver electrode 202 is affected by the presence of a biometric object such as a fingerprint. When a biometric object is present in the sensing area of a capacitive sensor 200, the output will be less in value than when no biometric object is present. In this regard, the output of the capacitive sensor 200 can be utilized for finger presence detection.

For finger presence detection, the output of the capacitive sensor 102 is compared to a threshold signal level to determine if the processing system 104 may maintain operation of the capacitive sensor 102 and the device 100, in general, in the second mode (i.e., low power) or return operation to the first mode (i.e., higher power, imaging mode).

Baseline Tracking

As discussed above, the transmitter and receiver electrodes and amplifier circuitry are exposed to environmental conditions within the device 100, such as temperature fluctuations. For instance, as the temperature of the device 100 changes, the output of the amplifiers may be affected. Additionally, the input surface (which may include a cover glass) may become contaminated due to debris or oils sticking to the surface, e.g., dirty surface, which may affect sensor readings. In certain embodiments, the threshold used to determine the presence of the biometric object is set in reference to a baseline output of the amplifier when the biometric object is not present at the capacitive sensor. As such, the environmental conditions around or within the device 100 may cause unwanted changes in this baseline output. Accordingly, unwanted changes in the baseline output may cause false readings provided by the capacitive sensor. A false reading from the capacitive sensor may cause the device 100 to improperly awaken and/or return the sensor 102 to the first mode (i.e., higher power) even when a biometric object is not present at a sensing region of the capacitive sensor.

Figure 3:
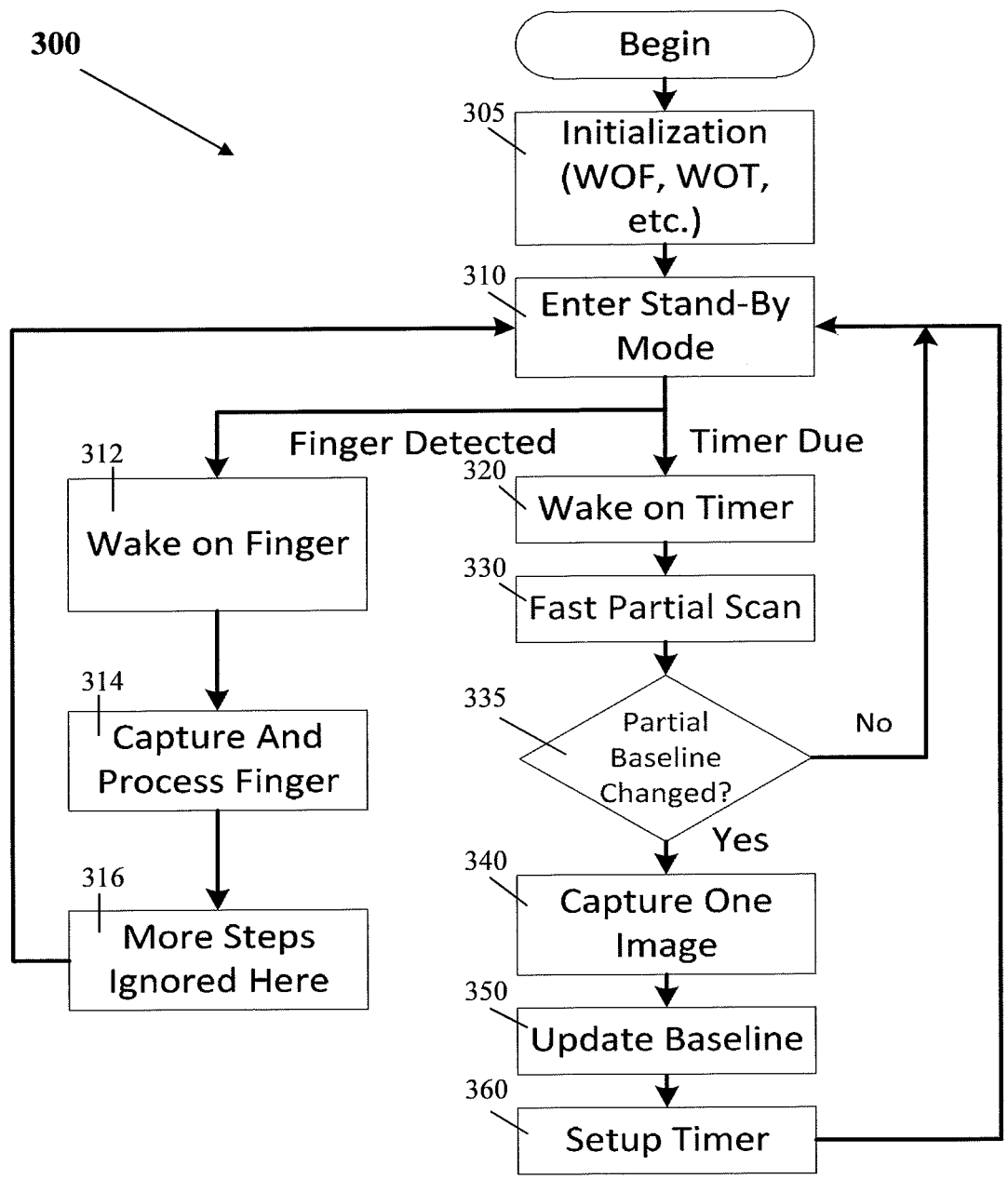
FIG. 3 illustrates a baseline tracking method according to an embodiment.

Techniques and principles disclosed herein and described in relation to FIG. 3 provide for tracking any unwanted changes in the baseline output of a capacitive sensor to avoid improper finger presence detection functionality. A baseline image is continuously, e.g., periodically, tracked and updated. The baseline image may be used to enhance fingerprint image processing. For example, during fingerprint matching or enrollment processing, a baseline image may be subtracted from an acquired fingerprint image to provide more accurate fingerprint matching or other fingerprint analyses. One example includes acquiring a fingerprint image for fingerprint authentication. In effect, each acquired fingerprint image includes a summation of the baseline signal and the fingerprint signal; subtracting the baseline from the acquired fingerprint image provides a robust fingerprint image.

Turning now to FIG. 3, a method for automatically tracking a baseline is shown according to an embodiment. As will be described in more detail below, according to an embodiment, a fast or partial baseline image or sensor scan is acquired periodically, and a full sensor scan is taken only if the "partial baseline" image reflects a significant enough change (e.g., exceeds a threshold) relative to a prior baseline image. A majority of the time, the sensor is in a sufficiently stable environment so that the baseline will likely not change appreciably and so that a complete sensor scan is not needed. Further, each partial baseline scan is significantly shorter than a regular full sensor scan, and consumes much less power than a regular full sensor scan. In prior methods, entire full sensor scans may be performed periodically for baseline tracking. The present embodiments thus provide baseline tracking systems and methods that advantageously consume less power than prior systems and methods.

FIG. 3 illustrates a baseline tracking method 300 according to an embodiment. In step 305, the system, e.g., processing system 104, is initialized. For example, operation mode switching parameters may be set. In an embodiment, a timer event is initialized; a timer is set to periodically trigger a timer event. The periodicity may be preset or may be adjustable. An example of periodicity may be on the order of 1 second or longer, or it may be on the order of a fraction of a second. In general, a periodicity on the order of about 1 second between timer events is practical for baseline image scan update processing as will be described in more detail below. In step 310, the sensor system enters a low-power, stand-by mode. In the stand-by mode, the sensor may be configured to periodically sense whether a fingerprint or other biometric object is present on or proximal to an input surface. When in the stand-by mode, different events may trigger a change to a different mode of operation. For example, in an embodiment, detection of the presence of a finger or the occurrence of a timer event transitions the system to a different mode of operation. In response to detection of a finger (a wake-on-finger event 312), the processing system transitions to a fingerprint processing mode 314 where one or more fingerprint images are captured for processing during processing steps 316. Processing steps 316 may include matching and authentication processing steps. For example, in step 316, a stored baseline image may be subtracted from a fingerprint image acquired in step 314 and the baseline-subtracted fingerprint image may be used for matching, authentication or enrollment. When finished, processing returns to the stand-by mode of operation (step 310).

In an embodiment, a timer event (wake on timer event) in step 320 transitions sensor operation to a baseline tracking mode of operation. As above, the timer event may be configured to occur periodically, e.g., every second or so. In step 330, in response to the timer event trigger, a partial baseline scan is captured or acquired by the sensor 102. In a code division multiplexing (CDM) embodiment, modulation signals are applied to the transmitter electrodes and the resultant signals are detected by the receiver electrode(s) and demodulated to discriminate electrical effects produced by an input object on or proximal to the input surface. For a full sensor scan, all transmitter electrodes may be driven simultaneously with each of a set of distinct drive waveforms or drive signals produced as a function of any number of distinct digital codes. For example, for 144 transmitter electrodes, 144 distinct drive waveforms are applied to the transmitter electrodes in 144 drive steps. Each distinct waveform has a different phase than all other waveforms (i.e., each waveform or drive signal is orthogonal or of different phase to all other waveforms or drive signals). For example, portions of three distinct, orthogonal waveforms to be applied to a subset of three transmitter electrodes ( . . . $TX_{N-1}$, $TX_N$, $TX_{N+1}$ . . . ) may be represented as follows:

a. [$TX_{N-1}$, $TX_N$, $TX_{N+1}$]=[1,1,1];
b. [$TX_{N-1}$, $TX_N$, $TX_{N+1}$]=[1,1,−1];
c. [$TX_{N-1}$, $TX_N$, $TX_{N+1}$]=[−1,1,1].

In some embodiments, certain transmitter electrodes need not be driven, or need not be active. In such embodiments, the above drive signals might be represented as follows, where $TX_N$ is not driven, or is not active:

a. [$TX_{N-1}$, $TX_N$, $TX_{N+1}$]=[1,0,1];
b. [$TX_{N-1}$, $TX_N$, $TX_{N+1}$]=[1,0,−1];
c. [$TX_{N-1}$, $TX_N$, $TX_{N+1}$]=[−1,0,1].

To implement a fast partial sensor scan according to an embodiment, some or all of the transmitter electrodes are simultaneously driven using a subset of the full set of drive signals or waveforms that would be applied during a full sensor scan. For example, for a full sensor scan, the full set of distinct drive signals or waveforms is applied to all the transmitter electrodes in a sequence, with each distinct drive signal being applied to all transmitter electrodes simultaneously. As each waveform is applied, a receiver signal is detected by each receiver electrode that is present or active. In some embodiments, a single receiver electrode is used, and in other embodiments, multiple receiver electrodes are used. For example, in some embodiments, a subset of the full set of N available receiver electrodes are used to detect resultant signals, e.g., two-thirds of all receiver electrodes, half of all receiver electrodes, less than half of all receiver electrodes, one quarter of all receiver electrodes, one-eighth of all receiver electrodes, etc, are active to detect signals. As an example, for devices where receiver electrodes are multiplexed with amplifiers, e.g., four electrodes per amplifier, one or two receiver electrodes per amplifier may be used for detection. The receiver electrodes used to detect resultant signals may be evenly distributed from among all receiver electrodes (e.g., every fourth receiver electrode as an example), or they may be unevenly distributed (e.g., $1^{st}$, $8^{th}$ $11^{th}$ and $19^{th}$ out of 20 receiver electrodes as an example of uneven distribution). In certain embodiments, at least one electrode proximal to a center of the receiver electrodes and at least one electrode proximal to a periphery of the electrodes are used.

For the partial sensor scan, the subset of the full set of drive signals used may comprise a small portion, e.g., 1% or 2% or more of the drive signals. Using a subset reduces the time taken to apply the drive signals concomitantly, yet the entire sensor is still "sensed" since for each drive step all active transmitter electrodes are driven simultaneously. For example, if 200 drive signals are present in the full set and only 1% (2 waveforms) of the drive signals are used for the partial sensor scan, then only 1% of the time it would take to apply all drive signals would be spent.

For the partial sensor scan, the subset of the full set of distinct drive signals is applied in a sequence. The sequence of any waveforms applied during the partial sensor scan may be different than in the full sensor scan. For example, if only the first (1), fifth (5) and tenth (10) distinct waveforms are applied, they need not be applied in order of 1, 5, 10 and may be applied in the order of 5, 1, 10 as an example. During each partial scan drive step, one waveform of the subset of the full set of waveforms that would be applied to the transmitter electrodes during a full sensor scan is applied to the transmitter electrodes, and each subsequent drive step includes applying a different one of the subset of waveforms in the sequence, wherein the subset comprises less than all of the full set of distinct waveforms.

In decision step 335, a determination is made as to whether the image acquired or captured during the partial baseline scan in step 330 represents a sufficient or significant enough change from the stored baseline image. For example, in one embodiment, the captured partial image may be compared with a stored baseline image, and if a difference between the captured partial baseline image and the stored baseline image exceeds a threshold, the baseline is determined to have changed sufficiently to warrant updating the stored baseline image. In one embodiment, the captured partial baseline image is compared with a portion of a full baseline image. In another embodiment, the captured partial baseline image is compared with a stored partial baseline image (e.g., stored from a previous step 350). For comparison of images, as an example, pixels of the partial image used in the determination may be compared with corresponding pixels in the stored baseline image, and a threshold value may be based on a maximum difference for one or multiple pixels. The threshold may be based on a summation of some or all pixel values. One skilled in the art will recognize many other ways of comparison to determine sufficiency of image change to warrant baseline image updating. If the determination in step 335 indicates that the partial baseline has not changed sufficiently to warrant updating the stored baseline image, the stand-by mode of operation is re-entered at step 310.

In step 340, if it has been determined that the partial image is sufficiently different from the stored baseline image, a full baseline image is captured or acquired by the imaging system. In step 350, the stored baseline image is updated. For example, in an embodiment, the full baseline image acquired in step 340 is stored to memory (e.g., memory 108 and/or storage 110 of FIG. 1) for later use as the stored baseline image. The full baseline image may be stored over an existing stored baseline image in a dedicated memory location. Alternatively, the acquired full baseline image may be stored, and a pointer or flag of a memory file system may be adjusted to indicate the location of the newly stored baseline image. In step 360, the timer is reset and the stand-by mode of operation is re-entered at step 310.

The present system and method embodiments advantageously consume less power than prior baseline tracking technologies. For example, consider the case of an example fingerprint sensor system that consumes about 20 μA in the stand-by mode and about 70 mA when in the imaging mode. Upon a wake-on-timer event with a set periodicity of 1 second, the system initiates a full sensor scan to determine the baseline, i.e., one full image scan is taken per second for baseline tracking. A typical full sensor scan may take about 40 ms. With these example parameters, the electrical current used per second is approximately the standby current used times the amount of time in standby mode plus the image current used times the amount of time in the imaging mode or (20 μA*(1−0.04))+(70 mA*0.04)=2.82 mA per second. Hence, a prior system with these parameters captures 1 baseline image scan per second with a current usage of about 2.82 mA per second, which is about 141 times higher than just the standby current usage of 20 μA per second. With these same parameters in the current embodiments, and with a fast partial scan that takes about 1% as much time as a full image scan (e.g., only 1% of driving waveforms used, yet entire sensor still covered), the current used is approximately (20 μA*(1−(0.04*0.01))+(70 mA*(0.04*0.01))=48 μA per second, which is about 58 times less current used than the prior example system. For these parameters, for a fast partial scan that takes about 2% as much time as a full image scan, the system would consume approximately 76 μA per second, and for a fast partial scan that takes about 3% as much time as a full image scan, the system would consume approximately 104 μA per second. Generally, a fast partial scan that uses about 1% or 2% of the driving waveforms is sufficient to identify a significant enough change in the baseline since the multiplexing (e.g., CDM) allows the full sensor to be scanned with a significantly reduced number of applied waveforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of automatically tracking a baseline input into a capacitive sensor having a plurality of transmitter electrodes and at least one receiver electrode, the method comprising:
    acquiring a partial baseline image of the entire capacitive sensor when no biometric object is present at the capacitive sensor, wherein the acquiring a partial baseline image includes driving all of the plurality of transmitter electrodes by applying a subset of a plurality of distinct waveforms in a sequence to the all of the transmitter electrodes, wherein the subset comprises less than all of the plurality of distinct waveforms applied when acquiring a full baseline image of the entire capacitive sensor;
    comparing the partial baseline image with a stored baseline image;
    acquiring the full baseline image of the entire capacitive sensor in response to a difference between the captured partial baseline image and the stored baseline image exceeding a threshold value and when no biometric object is present at the capacitive sensor; and
    updating the stored baseline image.

2. The method of claim 1, wherein updating the stored baseline image comprises storing the acquired full baseline image as the stored baseline image.

3. The method of claim 1, wherein the acquiring the full baseline image includes:
    applying the plurality of distinct waveforms in a sequence to the plurality of transmitter electrodes, wherein each of the plurality of distinct waveforms is applied to the plurality of transmitter electrodes simultaneously; and
    detecting receiver signals from the at least one receiver electrode for each of the plurality of waveforms applied to the plurality of transmitter electrodes.

4. The method of claim 1, wherein the acquiring a partial baseline image is in response to a timer event.

5. The method of claim 1, wherein the capacitive sensor comprises a capacitive fingerprint sensor.

6. The method of claim 1, wherein the stored baseline image is a previously stored full baseline image and the comparing the partial baseline image with a stored baseline image includes comparing the partial baseline image with a portion of the previously stored full baseline image.

7. The method of claim 1, wherein the stored baseline image is a partial baseline image and the comparing the partial baseline image with a stored baseline image includes comparing the partial baseline image with the stored partial baseline image.

8. The method of claim 1, further comprising subtracting the stored baseline image from a subsequent full fingerprint image to produce a baseline-subtracted fingerprint image.

9. An electronic system for capacitive sensing, the electronic system comprising:
    a capacitive sensor configured to capacitively sense an input object in proximity to a plurality of sensor electrodes comprising a plurality of transmitter electrodes, and at least one receiver electrode;
    a processor configured to drive the plurality of transmitter electrodes and to detect receiver signals from the at least ole receiver electrode, wherein the processor is configured to control the capacitive sensor to:
    acquire a partial baseline image of the entire capacitive sensor when no biometric object is present at the capacitive sensor by driving all of the plurality of transmitter electrodes by applying a subset of a plurality of distinct waveforms in a sequence to the all of the transmitter electrodes, wherein the subset comprises less than all of the plurality of distinct waveforms applied when acquiring a full baseline image of the entire capacitive sensor; and
    wherein the processor is further configured to:
    compare the partial baseline image with a stored baseline image;
    in response to a difference between the captured partial baseline image and the stored baseline image exceeding a threshold value, control the capacitive sensor to acquire the full baseline image of the entire capacitive sensor when no biometric object is present at the capacitive sensor; and
    update the stored baseline image using the acquired full baseline image.

10. The electronic system of claim 9, wherein the processor is configured to store the acquired full baseline image as the stored baseline image.

11. The electronic system of claim 9, wherein the processor is configured to control the capacitive sensor to acquire the full baseline image by:
    applying the plurality of distinct waveforms in a sequence to the plurality of transmitter electrodes simultaneously; and
    detecting receiver signals from the at least one receiver electrode for each of the plurality of waveforms applied to the plurality of transmitter electrodes.

12. The electronic system of claim 9, wherein electrodes in a subset of the at least one receiver electrode are distributed evenly among the subset of the at least one receiver electrode.

13. The electronic system of claim 9, wherein the processor is configured to control the capacitive sensor to acquire the partial baseline image in response to a timer event.

14. An electronic device for capacitive fingerprint sensing, the electronic device comprising:
- a capacitive fingerprint sensor having a plurality of sensor electrodes comprising a plurality of transmitter electrodes, and at least one receiver electrode, wherein the capacitive fingerprint sensor is configured to capacitively sense an input fingerprint on an input surface in proximity to the plurality of sensor electrodes;
- one or more processors coupled to the capacitive fingerprint sensor and configured to drive the plurality of transmitter electrodes and to detect receiver signals from the at least one receiver electrode, wherein the one or more processors are configured to control the capacitive fingerprint sensor to:
- acquire a partial baseline image of the entire capacitive sensor when no biometric object is present at the capacitive sensor by driving all of the plurality of transmitter electrodes by applying a subset of a plurality of distinct waveforms in a sequence to the all of the transmitter electrodes, wherein the subset comprises less than all of the plurality of distinct waveforms applied when acquiring a full baseline image of the entire capacitive sensor; and wherein the one or more processors are further configured to:
- compare the partial baseline image with a stored baseline image;
- in response to a difference between the acquired partial baseline image and the stored baseline image exceeding a threshold value, control the capacitive sensor to acquire the full baseline image of the entire capacitive sensor when no biometric object is present at the capacitive sensor; and
- update the stored baseline image using the acquired full baseline image.

15. The electronic device of claim 14, further including a glass or polymer material overlaying the capacitive fingerprint sensor, wherein a surface of the glass or polymer material comprises the input surface.

16. The electronic device of claim 14, wherein the one or more processors are configured to control the capacitive fingerprint sensor to acquire the full baseline image by:
- applying the plurality of distinct waveforms in a sequence to the plurality of transmitter electrodes simultaneously; and
- detecting receiver signals from the at least one receiver electrode for each of the plurality of waveforms applied to the plurality of transmitter electrodes.

17. The electronic device of claim 14, wherein the one or more processors are configured to control the capacitive fingerprint sensor to acquire the partial baseline image in response to a timer event.

* * * * *

UNITED STATES PATENT AND TRADEMARK OFFICE
CERTIFICATE OF CORRECTION

PATENT NO. : 11,068,686 B2
APPLICATION NO. : 16/129110
DATED : July 20, 2021
INVENTOR(S) : Guozhong Shen Page 1 of 1

It is certified that error appears in the above-identified patent and that said Letters Patent is hereby corrected as shown below:

In the Claims

At Column 14: Line 34, Claim 9, please delete "ole" and add --one--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*